May 1, 1951  C. J. CARR  2,550,969
PISTON ROD AND CROSSHEAD CONNECTION
Filed Jan. 5, 1948
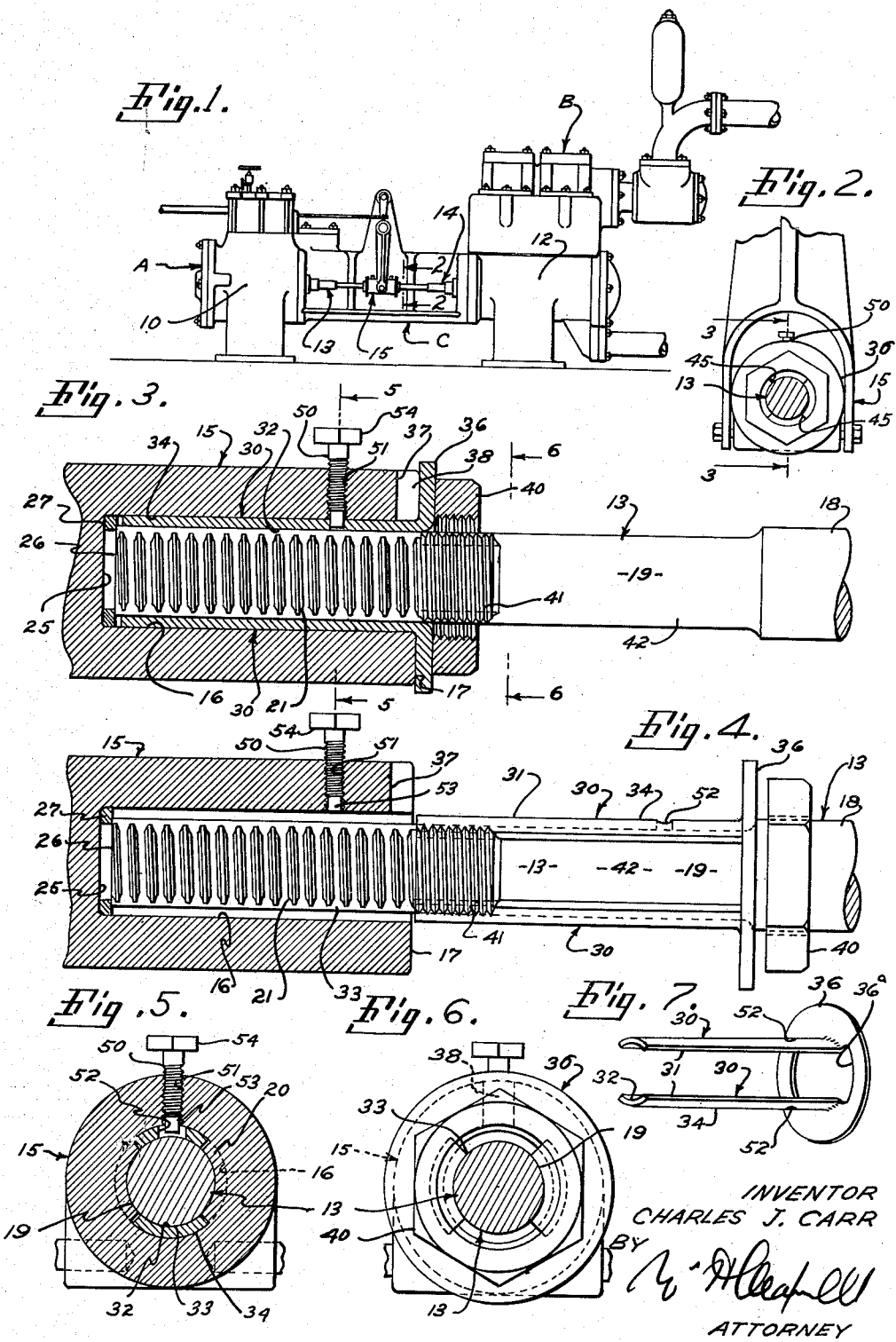
INVENTOR
CHARLES J. CARR
BY
ATTORNEY Patented May 1, 1951

2,550,969

UNITED STATES PATENT OFFICE 2,550,969

PISTON ROD AND CROSSHEAD CONNECTION

Charles J. Carr, Long Beach, Calif.

Application January 5, 1948, Serial No. 594

1 Claim. (Cl. 287—125)

This invention relates to a piston rod and crosshead connection, and it is a general object of the invention to provide a connection for parts such as piston rods and cross-heads whereby such parts are dependably and securely joined in a manner to be easily and quickly released or disconnected when desired.

Piston type pumps, and particularly slush pumps, are characterized by piston rods which carry pistons and which are releasably connected to cross-heads, or the like. In the case of the usual stem driven slush pump the steam and pump cylinders are in line and spaced apart with piston rods extending from the opposed ends of the cylinders and releasably connected to a cross-head that forms a coupling between the rods. It is common to provide long straight threaded connections between the rods and cross-heads so that these parts are dependably coup'ed and, in practice, these threaded connections are made up tight and are set by lock nuts. After extended periods of use or when the threads become slightly fouled or deformed, or when corrosion has occurred at the connected parts, it becomes exceedingly difficult to start or break such connections in order to separate the parts, and even after the joints are broken or started it is usually necessary to employ wrenches throughout the entire operation of separating the connected parts, all with the result that the operation is difficult and inconvenient of performance and is time consuming.

It is a general object of the present invention to provide a connection between a rod and crosshead, or the like, whereby such parts are dependably joined or coupled through a sturdy secure construction that may be quickly released through simple, easily performed operations. With the construction of the present invention the connected parts are normally secured together in a manner as dependable and secure as threads, and yet they may be easily parted or separated without tedious operation or manipulation such as attends the use of threads.

It is another general object of the present invention to provide a connection of the general character referred to which involves a lock means that positively retains the connected parts against accidental separation and which is, in and of itself, simple in form and easy of operation. The lock means of the present construction involves, primarily, a simple key which, when in place, positively prevents working or movement of the connected parts in a manner to allow their separation, the key being held in operating position by simple, effective retainers so that it does not become displaced except when deliberately engaged for this purpose.

The various objects and features of my invention will be fully understood from the following detailed description of typical preferred forms and applications of the invention, throughout which description reference is made to the accompanying drawings, in which:

Fig. 1 is a side elevation of a slush pump showing piston rods joined to a common crosshead to which they are connected by means of the construction of the present invention. Fig. 2 is an enlarged detailed transverse sectional view taken as indicated by line 2—2 on Fig. 1. Fig. 3 is an enlarged longitudinal sectional view of the joint construction of the present invention, being a view taken as indicated by line 3—3 of Fig. 2. Fig. 4 is a view similar to Fig. 3, showing the lock means in released position freeing the connected parts so that they can be separated. Fig. 5 is a transverse sectional view taken as indicated by line 5—5 on Fig. 3. Fig. 6 is a transverse sectional view taken as indicated by line 6—6 on Fig. 3. Fig. 7 is a perspective view of the key employed in the construction.

The present invention may be employed in or carried out in connection with various constructions. However, it is particularly useful and practical as applied to slush pumps such as are employed in the oil fields. In the case of slush pumps such as are employed in oil fields it is particularly important that time be conserved when making repairs to equipment such as slush pumps, and since my present invention is directed primarily at saving time when it is necessary to remove a piston rod from a slush pump. I will refer to it as being particularly useful in pumps used in oil fields and the like.

In the drawings the invention is shown applied to a simple or typical slush pump involving a steam end A and a pump end B joined and coupled by a suitable frame or bed C. The cylinder 10 of the steam end is in line with the cylinder 12 of the pump end, the two cylinders being maintained in the desired spaced relation through the bed C, as clearly shown in the drawings. Piston rods 13 and 14 extend from the opposing ends of the cylinders 10 and 12, respectively, and they are joined to a common cross-head 15. The construction of the present invention may be applied to or used in establishing connection between either of the piston rods and the cross-head. In the drawings I have indicated the construction of the present invention applied to connect each rod with the crosshead. In the following detailed description reference will be made to but one connection, that is, to the connection between one rod and the cross-head, it being understood that such description may be applied equally to both connections.

In accordance with the construction provided by the present invention the cross-head 15 has an opening or socket 16 entering it from the end 17 that faces the rod. The rod has a main or body portion 18 that enters the cylinder in which the rod operates, and it has an end portion 19 projecting from its outer or cross-head end to enter the socket 16.

In accordance with the construction provided by the present invention an interrupted thread connection is provided between the end portions 19 of the rod and the head 15, this connection being provided by a plurality of thread or tooth-like projections 20 on the inner wall or socket 16 cooperating with a plurality of like or corresponding projections 21 on the exterior of the rod portion 19. The projections or tooth-like parts 20 in the socket 16 are preferably arranged in longitudinal rows extending the entire length or depth of the socket. In the particular case illustrated two diametrically opposite rows of such tooth-like projections are provided, the teeth of each row extending approximately 90° around the interior of the socket.

The tooth-like projections 21 on the exterior of the rod part 19 are arranged in rows corresponding to the rows of projections in the socket. When the socket is provided with two rows of projections the end portion 19 of the rod is provided with two corresponding rows of projections and the projections are of about the same circumferential extent, as are the projections in the socket.

The projections 20 and 21, although tooth-like, in general form or character, are formed or pitched like threads so that they are, in effect, thread-like teeth. The teeth 20 and 21 are, of course, pitched in like manner so that they have thread-like engagement or cooperation, causing the end portion 19 of the rod to be advanced inward in the socket 16 or toward the bottom 25 thereof as the teeth of the socket and rod are rotated relative to each other and cooperate in connecting the rod and socket.

In carrying out the present invention I may terminate the inner end 26 of the rod portion 19 short of the bottom 25 of the socket in which case I provide suitable spacers or washers 27 between the end of the rod and the bottom of the socket to be clamped tight as the teeth-like projections 20 and 21 are moved into full engagement or register with each other. When the end portion 19 of the rod is inserted in the socket and the rod is rotated to a position where the teeth-like projections 20 and 21 are in register or bearing engagement, as shown in the drawings, then the end portion of the rod is positively held or retained in the socket with the result that the rod and cross-head are positively coupled together. As above pointed out, this coupling or connection may be made tight or established in a firm condition by inserting suitable washers 27 between the bottom of the socket and the end of the rod, as shown in the drawings.

The lock means provided for the interrupted thread connection above described is preferably a key means involving primarily one or more keys 30 insertable in the socket between adjacent rows of cooperating teeth-like projections when such teeth-like projections are in cooperative engagement, as shown in the drawings. Each key 30 is preferably a simple, sturdy key element involving an elongate shank 31 of such length as to extend the entire length of the socket 16 or substantially the length of the socket 16, and preferably arcuate in form so that its inner side 32 conforms to the exterior 33 of rod portion 19, while its exterior 34 conforms to the interior or wall of socket 16.

The shank portion of the key preferably fits between the exterior of the rod portion and the interior of the socket to slidably fit between these parts, as shown in the drawings. The shank portion of the key is preferably of such extent transversely or circumferentially of the rod portion 19 as to extend substantially 90° around the rod portion 19 or within the socket 16, with the result that it fully occupies the space provided by the adjacent rows of cooperating teeth-like projections when in operating position, as shown in Fig. 5 of the drawings. It is to be understood that in practice the cooperating teeth on the rod portion and in the socket may be slightly less than 90° in circumferential extent and the shank portion of the key may be slightly less than 90° in circumferential extent, all to the end that there is ample working clearance in the construction to enable the tooth-like projections on the rod portion and in the socket to be properly engaged and to enable the key to be readily arranged in working position, as shown in Figs. 3 and 5 of the drawings.

In the form of the invention shown in the drawings I provide two like keys joined or coupled by a single ring-like head. The outer ends of the keys are joined to a laterally projecting head 36 to facilitate removal of the keys when it is desired to release them from the connected parts. The head 36 is shown as a ring slidable over the end portion 19 of the rod and relieved or cut away at 36ª to pass the projections 21 as the key is slid into place over the end portion of the rod.

In practice a recess 37 may be provided in the end 17 of the cross-head to be opposite the head 36 on the keys in order to establish a socket or opening 38 into which a suitable tool can be inserted in order to pry the keys out or get them started out when it is desired to remove the keys to release the connected parts.

In accordance with the preferred forms of the invention I provide means for retaining the keys in operating position where they positively prevent rotation of the rod relative to the cross-head and, consequently, prevent disengagement of the rod from the cross-head. In the preferred form of the invention the retaining means is a screw means and it may involve a screw member on either the cross-head or on the rod, or both. In the drawings I have shown a screw member carried by the rod and retaining the keys in place, and I have also shown a screw member carried by the cross-head and retaining the key in place.

The screw member 40 carried by the rod to retain the keys in operating position is preferably in the form of a nut threaded onto a threaded portion 41 of the rod, which portion of the rod occurs immediately adjacent the end portion 19 of the rod that extends into the socket 16 of the cross-head. The member 40 may be a simple nut and the threaded part 41, which carries it, is so located as to enable the nut to be tightened onto the threaded part 41 to bear against the head 36 carrying the keys and thus positively retain the keys against displacement from between the portion 19 of the rod and the cross-head.

In the preferred form of the invention the threaded part 41 is somewhat larger in diameter than the part 19 of the rod from which the key projections 21 project in order to facilitate application of the nut to the part 41 by passing it freely over the portion 19 of the rod which carries the projections 31.

Further, in the form of the invention shown in the drawings the rod is provided with a portion or neck 42 connecting the body portion 18 of the rod and the threaded part 41 and establishing a part of the rod accommodating the keys so that the keys can be withdrawn from the cross-head to a position such as is shown in Fig. 4, without interfering with any part of the rod. To thus facilitate the passage of the keys from the engaged or active position shown in Fig. 3 to that shown in Fig. 4, keyways 45 are provided in the threaded portion 41 registering with the keys when the rod is engaged in the cross-head, as shown in the drawings. The head 36 is cut away deep enough at 36ᵃ to pass the remaining or projecting parts of the threaded portion 41.

When providing a screw member in the form of a nut 40 that can be tightened against the head 36, it may be desirable to taper the shanks of the keys somewhat so that the keys are wedged tightly into operating position by tightening the nut against the head. Through this construction play or looseness may be taken out of the structure. It is to be observed that when the nut 40 is disengaged from the threaded portion 41 to allow withdrawal of the keys to the position shown in Fig. 4, the nut 40 is slid over the neck 42 and onto the end portion of the body part 18 of the rod.

The threaded member carried by the cross-head 15 for retaining the keys in operating position is shown as a single screw 50 threaded in a bore 51 formed laterally in the cross-head 15 communicating with the socket 16 into which the end portion 19 of the rod is received. The screw 50 is shown provided at its inner end with a projecting part or tip 53 that enters an opening 52 formed in the shank of one of the keys. A head 54, such as a polygonal head, is provided on the outer end of the screw to facilitate its operation. It is to be observed that there is an opening 52 in the shank of each key to register with opening 51 in the cross-head when the keys are fully engaged or is in operating position with either key in position to be engaged by the screw 50. When an opening 52 registers with the opening 51 the screw 50 can be operated so that the tip 53 of the screw enters a key thus positively preventing displacement of both keys from the cross-head.

From the foregoing description it will be apparent that I have provided a construction which enables the rod to be easily and quickly engaged with the cross-head to positively connect these parts. To engage the rod with the cross-head it is merely necessary to insert the end portion 19 of the rod into the socket 16 and then turn the rod relative to the cross-head to bring the key projections 20 and 21 into proper cooperative engagement or into register. As above pointed out washers 27 may be provided so that the structure is tight when the key projections are fully registered.

With the rod and cross-head engaged the keys 30 may be slid into position as shown in Fig. 3 and they may be retained in position where they lock the rod and cross-head against disengagement by application of the nut 40 to the threaded part 41 or by operation of the screw 50 to engage the tip 53 in an opening 52, or both of these retaining means may be used.

When it is desired to detach the rod from the head it is merely necessary to disengage or release the retaining means as, for instance, the nut 40 or screw 50 or both, whereupon the keys may be readily withdrawn from between the rod and head. Should the keys be wedged tight or stuck they can be easily and quickly disengaged by inserting a suitable pry or tool into the opening 37 provided for that purpose. With the keys removed the rod can be easily rotated relative to the head enough to disengage the key projections 21 of the rod from the key projections 20 of the head, whereupon the rod portion 19 can be readily withdrawn from the socket of the cross-head.

Should the key projections of the two parts be wedged or seated tightly together, force may be applied, as for instance through a wrench, or the like, enough to break the connection in order to disengage the key projections of the two parts. When the key projections have thus been disengaged by but a fractional turn of the rod relative to the cross-head, the cross-head and the rod are freed so that they can be easily separated without the use of force or tools. It will be apparent that the construction of the present invention is not only simple of construction, but that it is secure and dependable, and is very simple and quick to operate.

Having described only typical preferred forms and applications of my invention, I do not wish to be limited or restricted to the specific details herein set forth, but wish to reserve to myself any variations or modifications that may appear to those skilled in the art and fall within the scope of the following claim:

Having described my invention, I claim:

In combination, an elongate member having a socket entering it from one end and terminating at a flat bottom, there being interrupted threads in the socket, a rod with a main portion projecting from said end of said member and with an end portion entered in the socket and having interrupted threads cooperating with the threads in the socket, an annular stop engaged between the inner end of said end portion of the rod and the bottom of the socket, a key having an annular flange portion surrounding the rod and located adjacent the said end of the elongate member and having circumferentially spaced arms projecting from the flange into the socket between the threads and positively holding the rod against rotation in the socket with the threads locked together, a nut threaded on the rod and holding the flange in engagement with said end of the elongate member, and a lock screw carried by the elongate member and extending laterally thereof into an opening in one of the arms.

CHARLES J. CARR.

REFERENCES CITED

The following references are of record in the file of this patent:

UNITED STATES PATENTS

| Number | Name | Date |
|---|---|---|
| 490,876 | Kirsch-King | Jan. 31, 1893 |
| 610,576 | Auger | Sept. 13, 1898 |
| 674,115 | Heibrath | May 14, 1901 |
| 2,004,187 | Bommer | June 11, 1935 |
| 2,051,525 | Howard | Aug. 18, 1936 |
| *2,057,361 | Bissell* | Oct. 13, 1936 |
| 2,337,711 | Crake | Dec. 28, 1943 |

FOREIGN PATENTS

| Number | Country | Date |
|---|---|---|
| 25,813 | Great Britain | of 1897 |